United States Patent [19]

Lace

[11] 3,850,357

[45] Nov. 26, 1974

[54] FAST-FORWARD TAPE DRIVE MEANS FOR CARTRIDGE TAPE PLAYER

[75] Inventor: Melvin A. Lace, Prospect Heights, Ill.

[73] Assignee: Motorola, Inc., Chicago, Ill.

[22] Filed: Mar. 1, 1974

[21] Appl. No.: 447,463

[52] U.S. Cl. .................................................. 226/178
[51] Int. Cl. .............................................. B65h 17/22
[58] Field of Search .......... 226/178, 30, 40, 42, 188

[56] References Cited

UNITED STATES PATENTS

| | | | |
|---|---|---|---|
| 3,385,497 | 5/1968 | Taraborrelli | 226/178 |
| 3,666,153 | 5/1972 | Stahl | 226/178 |

*Primary Examiner*—Richard A. Schacher
*Attorney, Agent, or Firm*—Donald Lisa; Vincent J. Rauner

[57] ABSTRACT

A cartridge tape drive system comprises a capstan drive shaft, a flywheel mounted thereon, a tape drive motor coupled to the flywheel by means of a belt looped about the flywheel and drive shaft of the tape drive motor and further, a fast-forward tape drive arrangement. The last-mentioned arrangement comprises first and second pulley wheels, one mounted on the capstan shaft an the other on the drive motor output shaft and a pair of oneway clutches. In a preferred embodiment, a first one of the clutches couples the second pulley wheel and motor drive shaft and the second clutch couples the capstan shaft and flywheel. The pulley wheels are coupled by a second belt looped thereabout in a figure eight or crossed over configuration. In normal play, the drive motor is energized in a first sense to rotate the output shaft in a first direction. The first one-way clutch is engaged and the second is disengaged to drive the flywheel and capstan in a first direction at a first playback speed. For fast-forward, the electrical connections to the drive motor are reversed to rotate the output shaft in the opposite direction. At this time, the first one-way clutch is decoupled and the second is engaged to impart to the capstan shaft, through the pulley wheels and crossed over belt, rotation in the first direction, but at a speed greater than the normal playback speed.

8 Claims, 3 Drawing Figures

FAST-FORWARD TAPE DRIVE MEANS FOR CARTRIDGE TAPE PLAYER

BACKGROUND

This invention relates generally to cartridge type tape players and more particularly to the tape drive systems therefor.

Conventionally, in cartridge type tape players upon insertion of a cartridge into the player, the recording tape in the cartridge is driven therethrough past a magnetic tape head in the player by means of a capstan shaft. The shaft is driven rotatably by a drive motor coupled by a belt to a flywheel mounted on the capstan shaft for rotation therewith. The tape drive motor drives the capstan shaft at a predetermined speed suited for the undistorted playback of information recorded on the tape.

If one desires, however, to avoid listening to certain information recorded on the tape and wishes to move ahead to other information recorded therein, he must wait until the undesired portion has been driven past the tape head to a point at which the information to which he desires to listen is found.

No adequate arrangement is provided in tape cartridge players presently on the market to provide a speedup of the tape driving instrumentalities in a forward direction to avoid listening to the undesired information.

SUMMARY

Accordingly, it is a primary object of the present invention to provide a new and improved tape drive system for a cartridge tape player which permits the driving of the tape through the cartridge at a speed greater than the tape playing speed in a forward direction.

It is another object of the present invention to provide in a cartridge type tape player fast-forward tape drive apparatus which is compatible with presently used tape drive arrangements.

It is still another object of the present invention to provide a fast-forward tape drive arrangement of the above described type which is simple in construction and reliable in operation.

Briefly, a preferred embodiment of the tape drive system for a cartridge tape player according to the invention includes the usual capstan drive shaft upon which is mounted a flywheel. A first one-way clutch couples the capstan and flywheel for rotation in a first, playback direction. An elastic belt couples the flywheel to the drive shaft of a drive motor. A first pulley member of a diameter less than that of the flywheel is mounted on the capstan for rotation therewith. A second pulley member of a similar diameter is coupled through a second one-way clutch mechanism to the drive shaft of the motor. A second elastic belt extends between the pulley members and is crossed over in figure eight fashion.

During normal operation of the tape player, the motor is driven in a first direction at a given speed, and through the first-mentioned belt and engaged first one-way clutch, drives the flywheel and capstan shaft at the usual playback speed. The second one-way clutch mechanism coupled between the second pulley member and motor drive shaft is disengaged at this time. When one desires to propel the tape at a greater speed through the cartridge, a switch is activated which reverses the direction of rotation of the drive motor but does not change the output speed thereof. At this time, the first one-way clutch mechanism is disengaged and the second one-way clutch mechanism is engaged to drive the capstan shaft through the pulley and figure eight belt arrangement. Because the belt is crossed over, the direction of rotation of the capstan shaft will be the same as when driven by the conventional belt arrangement. However, because of the reduced diameter pulleys, the capstan is driven at a greater speed and consequently the tape is driven through the cartridge more rapidly. At this time, the flywheel is being rotated, but without affecting the drive of the capstan shaft. When it is desired to reduce the speed to that of playback, the switch is deactivated to reverse the direction of rotation of the drive motor.

DETAILED DESCRIPTION

Figure 1:
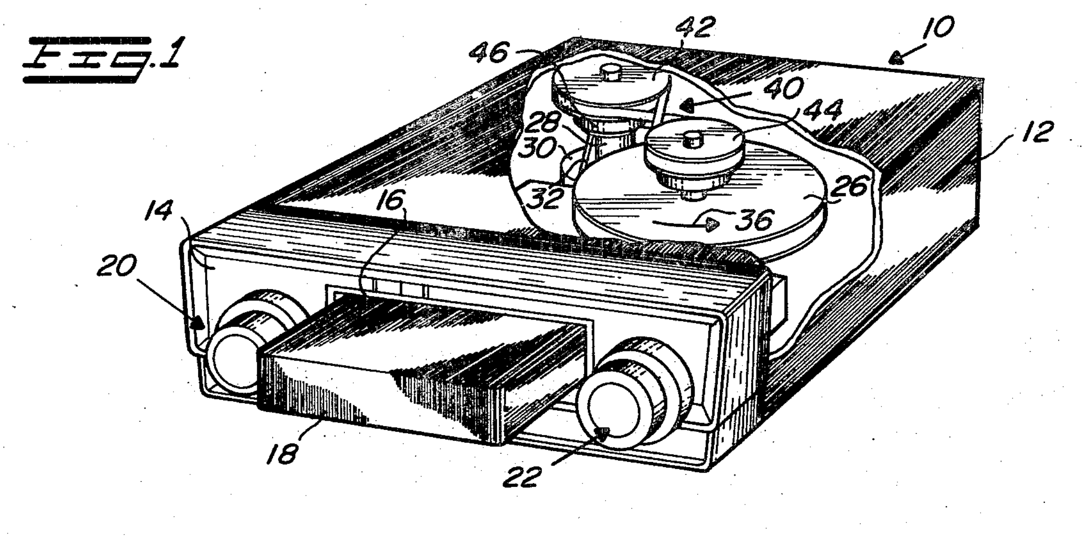
FIG. 1 is a cutaway, perspective view of a tape player device including a tape drive arrangement according to the invention.

Referring now to the drawing in greater detail wherein like numerals have been employed throughout the various views to illustrate similar components, there is shown in FIG. 1, a cartridge tape player designated generally by the numeral 10. The player includes the usual housing 12 having a front bezel 14 with a central opening 16 for receiving a tape cartridge therein such as 18. Controls 20, 22 are provided on opposite sides of the cartridge receiving cavity. The control knob 20 includes on/off-volume selectors and the control 22 can be utilized for changing the tonal quality of the sound reproduction of the tape information, indexing of the magnetic tape head (not shown) as well as for activation of the fast-forward tape drive apparatus according to the invention.

Figure 2:
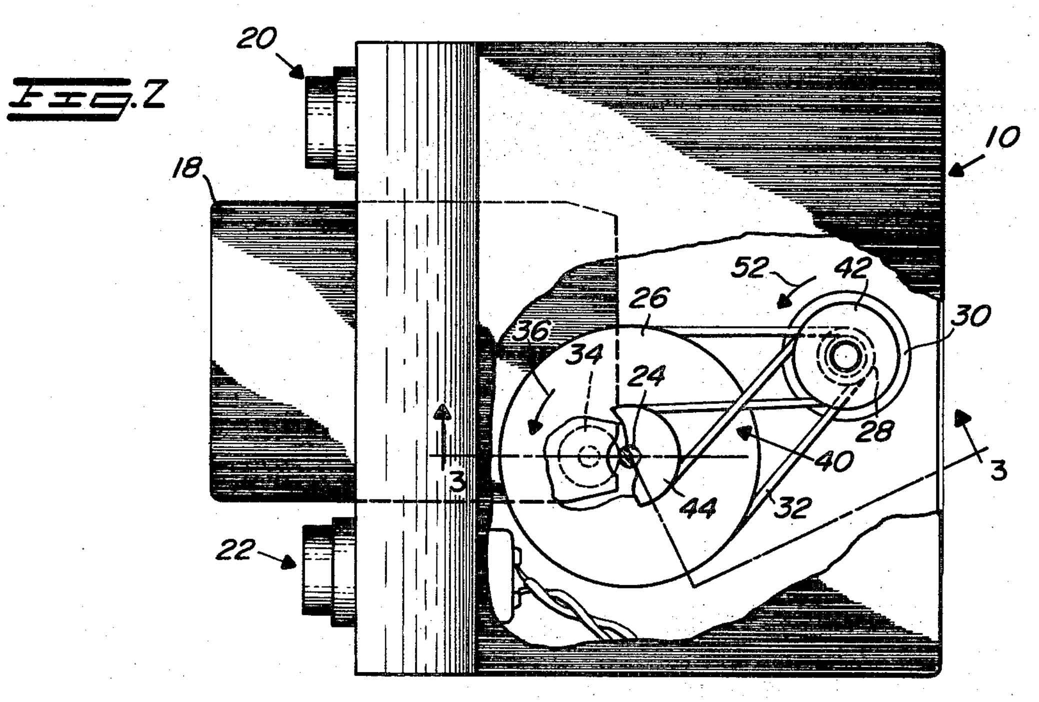
FIG. 2 is an enlarged, top, plan view of the tape player of FIG. 1 also cut away to show the tape drive arrangement according to the invention.
Figure 3:
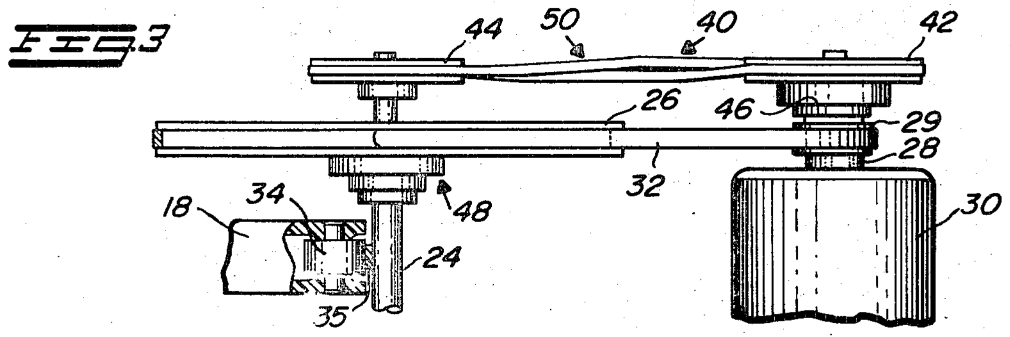
FIG. 3 is a sectional view of the player of FIG. 2 taken along the line 3—3 illustrating the tape drive arrangement according to the invention.

As can be seen in the cutaway portion of the tape player, and in FIGS. 2 and 3 of the drawing, there is provided the usual capstan drive shaft 24 and flywheel mounted thereon. The flywheel is coupled to the rotatably output drive shaft 28 of the electrically operated drive motor 30 of the player through an elastic drive belt 32. The belt extends about the periphery of the flywheel and about a hub 29 mounted on the shaft 28 of the drive motor.

In normal operation, as is the case in conventional type cartridge tape players, upon insertion of a cartridge 18 into the player, a pressure roller 34 (See FIG. 2) over which the magnetic recording tape 35 (See FIG. 3) in the cartridge passes, is moved into driving engagement with the capstan shaft 24 of the tape drive system. Energization of the drive motor 30 rotates the flywheel and capstan shaft in the direction of arrow 36, (See FIGS. 1 and 2) at a first predetermined speed. The speed is selected for proper audio reproduction of the recorded information on the magnetic recording tape in cartridge 18.

The tape is pressed between the pressure roller 34 and capstan shaft 24 and is driven thereby past other tape playing instrumentalities, such as, for example, a magnetic tape playing head, etc., not shown in the figures of the drawing. The latter are not shown since they make up no part of the present invention.

In addition to the usual tape drive arrangement described heretofore, there is included according to the invention, a fast-forward tape drive assembly, generally indicated by the numeral 40.

The fast-forward tape drive assembly 40 includes a pair of pulley wheels, 42, 44, each having a diameter less than that of the flywheel 26. Pulley wheel 42 is coupled through a one-way clutch assembly 46 to the output drive shaft 28 of motor 30. Pulley wheel 44 is directly coupled to the capstan shaft 24, and flywheel 26 is coupled through a second one-way clutch to the capstan shaft 24. It should be noted that the first and second one-way clutch assemblies 46, 48 operate in opposite directions of rotation; i.e., clutch assembly 48 is engaged upon rotation in the direction of arrow 36, and disengaged upon rotation in the opposite direction, while clutch assembly 46 is engaged upon rotation in the last-mentioned direction and disengaged upon rotation in the direction of arrow 36. The pulley wheels 42, 44 are coupled by a second elastic belt 50. The belt 50 is, however, crossed over into a figure eight configuration as seen in the drawing.

In operation, upon insertion of a cartridge 18 into the tape player 10 and when motor 30 is energized in a first electrical sense or polarity, the output drive shaft 28 of the motor is driven in the direction of arrow 52 at a given speed of rotation (FIG. 2) to in turn, through belt 32, drive the flywheel and capstan 26, 24, respectively, in the direction of arrow 36 for transporting tape 35 through the cartridge 18 at the "playback" speed. At this time, the one-way clutch 48 is in an engaged condition for coupling flywheel 26 and capstan shaft 24. The other clutch mechanism 46, is declutched so that no driving force from the motor drive shaft 28 is imparted to pulley wheel 44. Both the pulley wheels 42, 44 are, however, rotating at this time.

When it is desired to drive the tape 35 through cartridge 18 at a fast-forward speed; i.e., a speed greater than the playback speed but in the same direction, control 22 is depressed. The depression thereof reverses the electrical circuit connections (not shown) to drive motor 30, causing the output drive shaft 28 thereof to be driven in a direction opposite from arrow 52. The speed of the motor 30, however, is not changed. When the latter occurs, one-way clutch assembly 46 is engaged, causing pulley wheel 42 to be coupled to the motor drive shaft.

The driving of the pulley wheel 42 by the drive shaft 28 of motor 30 causes the pulley wheel 42, through belt 50, to impart rotation to pulley wheel 44 and to the capstan shaft 24. Because the belt 50 is crossed over in figure eight configuration, the resultant direction of rotation of the pulley wheel 44 and capstan shaft 24 is the same as in the case when driven by the flywheel and belt 32; i.e., see arrow 36. Because of the diameters of the pulleys 42, 44, the speed of rotation of the capstan is increased over that of the playback speed.

In the fast-forward condition, clutch 48 is declutched so that flywheel 26 and capstan shaft 24 are decoupled. Thus, no force is applied by the flywheel against the driving force provided to capstan shaft 24 by the crossed over belt and pulley wheel arrangement.

In the embodiment of the invention shown in the drawing, the flywheel and capstan are coupled through a one-way clutch 48 and the pulley wheel 42 and motor drive shaft are coupled through a second, oppositely engaged one-way clutch 46. However, if desired, the one-way clutches may be used to couple the motor drive shaft hub 29 to the motor drive shaft 28 and the pulley wheel 42 to the motor drive shaft 28, respectively; upon rotation of the motor drive shaft in corresponding directions or alternatively two one-way clutches of a similar type; i.e., engageable in the same direction of rotation, may be used to couple the flywheel and capstan shaft, and pulley wheel 44 and the capstan shaft.

Thus, the fast-forward drive arrangement according to the invention is one which is relatively simple in construction, efficient in operation and can easily be adapted for use with a conventional cartridge type tape player with little modification thereof.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. In a cartridge tape player, tape drive means including a capstan drive shaft mounted rotatably therein for engaging the pressure roller in a tape cartridge inserted into the player for driving the recording tape therein through the cartridge in a first direction, a flywheel mounted on said capstan shaft, drive motor means including a rotatably driven output drive shaft, a hub mounted on said output drive shaft and first belt means looped about said hub and said flywheel for driving said capstan shaft rotatably in a first direction at a first speed upon electrical energization of said motor means in a first sense, fast-forward tape drive means coupled to said tape drive means and including in combination: first pulley wheel means coupled to said output drive shaft, first one-way clutch means engageable in a first rotatable direction and disengageable in a second rotatable direction coupling said first pulley wheel means to said output drive shaft, second pulley wheel means coupled to said capstan shaft, second one-way clutch means disengageable in said first rotatable direction and engageable in said second rotatable direction coupling one of said flywheel and said hub to said capstan shaft and drive motor means output drive shaft, respectively, second belt means looped about said first and second pulley wheel means for coupling the latter, said second belt means being crossed over in figure eight fashion, said drive motor means driving said first pulley wheel means rotatably in a direction opposite from said first direction of rotation upon energization of said drive motor means in a second, opposite electrical sense, to drive said capstan shaft in said first rotatable direction at a second speed, greater than said first speed for transporting said tape more rapidly through said cartridge in said first direction.

2. A cartridge tape player as claimed in claim 1 wherein said second one-way clutch means is interposed between and couples said flywheel and said capstan shaft, and wherein upon energization of said drive motor means in said second electrical sense, said second one-way clutch means is declutched to decouple said flywheel and capstan shaft.

3. A cartridge tape player as claimed in claim 1 wherein the diameters of said first and second pulley wheels are less than the diameter of said flywheel.

4. A cartridge tape player as claimed in claim 3 wherein the diameters of said first and second pulley wheels are substantially equal.

5. In a cartridge tape player, tape drive means including a capstan drive shaft mounted rotatably therein for engaging the pressure roller in a tape cartridge inserted into the player for driving the recording tape therein through the cartridge in a first direction, a flywheel mounted on said capstan shaft, drive motor means including a rotatably driven output shaft, and first belt means looped about said output shaft and said flywheel for driving said capstan shaft rotatably in a first direction at a first speed upon electrical energization of said motor means in a first electrical sense, fast-forward tape drive means coupled to said tape drive means, including in combination: a first pulley wheel coupled to said output drive shaft, a first one-way clutch mechanism engageable in a first rotatable direction and disengageable in a second rotatable direction, coupling said first pulley wheel to said output drive shaft, a second pulley wheel mounted on said capstan shaft for rotation therewith, a second one-way clutch mechanism disengageable in said first rotatable direction and engageable in said second rotatable direction and second belt means looped about said first and second pulley wheels for coupling the latter, said second belt means being crossed over in figure eight fashion, said drive motor means driving said first pulley wheel means rotatably in a direction opposite from said first direction of rotation upon energization of said drive motor means in an opposite electrical sense, said first one-way clutch mechanism being engageable to impart rotation to said first pulley wheel for driving said capstan shaft in said first rotatable direction at a second speed, greater than said first speed for transporting said tape more rapidly through said cartridge in said first direction.

6. In a cartridge tape player, tape drive means including a capstan drive shaft mounted rotatably therein for engaging the pressure roller in a tape cartridge inserted into the player for driving the recording tape therein through the cartridge in a first direction, a flywheel mounted on said capstan shaft for rotation, drive motor means including a rotatably driven output shaft and first belt means looped about said output shaft and said flywheel for driving said capstan shaft rotatably in a first direction at a first speed upon energization of said motor means in a first electrical sense, fast-forward tape drive means coupled to said tape drive means and including in combination: a first pulley wheel mounted on said output drive shaft, a second pulley wheel mounted on said capstan shaft, second belt means looped about said first and second pulley wheels for coupling the latter, said second belt means being crossed over in figure eight fashion and clutch means engageable in one rotatable direction and disengageable in a second, opposite rotatable direction, said clutch means interposed between and coupling one of said first and second pulley wheels and said output drive shaft and said capstan shaft, respectively, whereby said drive motor means drives said first pulley wheel means rotatably in a direction opposite from said first direction of rotation upon energization of said drive motor means in a second, opposite electrical sense and said clutch means is engaged to impart rotation to said capstan shaft through said crossed over belt and second pulley wheel in said first rotatable direction at a second speed, greater than said first speed for transporting said tape more rapidly through said cartridge in said first direction.

7. A cartridge tape player as claimed in claim 6 wherein said clutch means is interposed between and couples said first pulley wheel to said output drive shaft.

8. A cartridge tape player as claimed in claim 7 further including second clutch means interposed between and coupled to said capstan shaft and said flywheel, said second clutch means being disengageable in said first rotatable direction and engageable in said second rotatable direction for coupling said capstan shaft and flywheel upon energization of said drive motor in said first electrical sense and for decoupling said capstan shaft and flywheel upon energization of said drive motor in said second, opposite electrical sense.

* * * * *

UNITED STATES PATENT AND TRADEMARK OFFICE

CERTIFICATE OF CORRECTION

PATENT NO. : 3,850,357

DATED : November 26, 1974

INVENTOR(S) : Melvin A. Lace

It is certified that error appears in the above-identified patent and that said Letters Patent are hereby corrected as shown below:

In the Abstract, line 8, change "an" to --and--.

Column 2, lines 50-51, change "rotatably" to --rotatable--.

Signed and sealed this 15th day of July 1975.

(SEAL)
Attest:

RUTH C. MASON
Attesting Officer

C. MARSHALL DANN
Commissioner of Patents
and Trademarks